(12) United States Patent
Xiu et al.

(10) Patent No.: US 12,355,940 B2
(45) Date of Patent: Jul. 8, 2025

(54) MOTION COMPENSATION USING COMBINED INTER AND INTRA PREDICTION

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 17/562,349

(22) Filed: Dec. 27, 2021

(65) Prior Publication Data
US 2022/0124313 A1    Apr. 21, 2022

Related U.S. Application Data

(63) Continuation of application No. PCT/US2020/040925, filed on Jul. 6, 2020.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS 6,584,154 B1   6/2003   Wu
2015/0229965 A1   8/2015   Park et al.
(Continued)

FOREIGN PATENT DOCUMENTS

EP   3881538 A1   9/2021
JP   2015522988 A   8/2015

OTHER PUBLICATIONS

Van et al., "CE10-related: Inter-intra prediction combination," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0096-v3.*

(Continued)

*Primary Examiner* — Edemio Navas, Jr.
(74) *Attorney, Agent, or Firm* — Arch & Lake LLP; Shen Wang; Hao Tan

(57) ABSTRACT

The present disclosure relates to a video coding method, a computing device, and a storage medium. The method includes: obtaining one or more reference blocks associated with a current block of a video picture and one or more previously coded pictures for predicting the current block; generating an inter prediction based on one or more motion vectors from the current block to the one or more reference blocks; generating a first intra prediction based on a plurality of neighboring reconstructed reference samples associated with a plurality of neighboring blocks of the current block in the video picture; determining a first weight based on the plurality of neighboring blocks; generating a third prediction by combining the inter prediction and the first intra prediction based on the first weight; and generating a final prediction based on the plurality of neighboring reconstructed samples and the third prediction.

10 Claims, 15 Drawing Sheets

$$P_{CIIP} = \frac{1}{4} P_{inter} + \frac{3}{4} P_{intra}$$

$$P_{CIIP} = \frac{3}{8} P_{inter} + \frac{5}{8} P_{intra}$$

$$P_{CIIP} = \frac{5}{8} P_{inter} + \frac{3}{8} P_{intra}$$

$$P_{CIIP} = \frac{3}{4} P_{inter} + \frac{1}{4} P_{intra}$$

Related U.S. Application Data

(60) Provisional application No. 62/871,128, filed on Jul. 6, 2019, provisional application No. 62/871,082, filed on Jul. 5, 2019.

(51) Int. Cl.
  *H04N 19/159* (2014.01)
  *H04N 19/176* (2014.01)
  *H04N 19/46* (2014.01)

(56) References Cited

U.S. PATENT DOCUMENTS

| | | | |
|---|---|---|---|
| 2017/0251213 A1* | 8/2017 | Ye | H04N 19/159 |
| 2020/0162728 A1* | 5/2020 | Van der Auwera | H04N 19/423 |
| 2020/0404253 A1* | 12/2020 | Chen | B23P 15/00 |

OTHER PUBLICATIONS

Zhao et al., "Non-CE: Weighted intra and inter prediction mode," Joint Video Experts Team (JVET) of ITU-T SG 16 WP 3 and ISO.IEC JTC 1/SC 29/WG 11, 15th Meeting: Gothenburg, SE, Jul. 3-12, 2019, JVET-O0537.*

Luong Pham Van et al.,Kwai Inc, Qualcomm Inc, "CE10-related: Inter-intra prediction combination", Joint Video Experts Team(JVET) of ITU-T SG 16 WP 3 and ISO/IEC JTC 1/SC 29/WG 11, JVET-M0096-v3, 13th Meeting, Marrakech,MA, Jan. 9-18, 2019,(4p).

Liang Zhao et al.,Tencent, "Non-CE: Weighted intra and inter prediction mode", Joint Video Experts Team(JVET) of ITU-T SG 16 WP 3 and ISO/IEC JTC 1/SC 29/WG 11, JVET-O0537, 15th Meeting, Gothenburg, SE, Jul. 3-12, 2019, (6p).

Kenneth Andersson et al., "Combined Intra Inter Prediction Coding Mode", ITU-Telecommunications Standardization Sector, VCEG-AD11, Study Group 16 Question 6, Video Coding Experts Group(VCEG) 30th Meeting, Hangzhou, China, Oct. 20-27, 2006, Filename VCEG-AD11.doc, Generated Oct. 18, (6p).

Extended European Search Report of EP Application No. 20836790.4 dated Sep. 19, 2022, (9p).

International Search Report of International Application No. PCT Application No. PCT/US2020/040925 dated Oct. 21, 2020, (4p).

Jianle Chen et al., Algorithm description for Versatile Video Coding and Test Model 5 (VTM 5), Joint Video Experts Team (JVET) of ITU-T SG 16 WP 3 and ISO/IEC JTC 1/SC 29/WG 11, [Document: JVET-N1002-v2 (Version 2)], 14th Meeting: Geneva, CH, Jun. 11, 2019, (79p).

Andre Seixas Dias et al., CE10: CIIP using explicit signaling of weights (CE10-1.2), Joint Video Experts Team (JVET) of ITU-T SG 16 WP 3 and ISO/IEC JTC 1/SC 29/WG 11, [Document: JVET-N0298 (Version 3)], 14th Meeting: Geneva, CH, Mar. 19, 2019, (5p).

Luong Pham Van et al., CE10: CIIP with position-independent weights (Test CE10-1.1), Joint Video Experts Team (JVET) of ITU-T SG 16 WP 3 and ISO/IEC JTC 1/SC 29/WG 11, [Document: JVET-N0302_v1 (Version 1)], 14th Meeting: Geneva, CH, Mar. 13, 2019, (3p).

Xiaoyu Xiu et al., CE10-related: Simplification on combined inter and intra prediction (CIIP), Joint Video Experts Team (JVET) of ITU-T SG 16 WP 3 and ISO/IEC JTC 1/SC 29/WG 11, [Document: JVET-N0327-r1 (Version 3)], 14 Meeting: Geneva, CH, Mar. 25, 2019, (3p).

* cited by examiner

MOTION COMPENSATION USING COMBINED INTER AND INTRA PREDICTION

CROSS-REFERENCE TO RELATED APPLICATIONS

The present application is a continuation application of PCT application No. PCT/US2020/040925 filed on Jul. 6, 2020, which claims priority to U.S. Provisional Application No. 62/871,082, entitled "Enhanced Motion Compensation Using Combined Inter and Intra Prediction" filed on Jul. 5, 2019, and U.S. Provisional Application No. 62/871,128, entitled "Enhanced Motion Compensation Using Combined Inter and Intra Prediction" filed on Jul. 6, 2019, the disclosures of which are incorporated by reference in their entireties for all purpose.

FIELD

The present application generally relates to video coding and compression, and in particular but not limited to, methods and computing devices for motion compensation using combined inter and intra prediction in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY

In general, this disclosure describes examples of techniques relating to motion compensation using combined inter and intra prediction in video coding.

According to a first aspect of the present disclosure, there is provided a method for video coding, including: obtaining one or more reference blocks associated with a current block of a video picture, wherein the one or more reference blocks are associated with one or more previously coded pictures for predicting the current block; generating an inter prediction based on one or more motion vectors from the current block to the one or more reference blocks; generating a first intra prediction based on a plurality of neighboring reconstructed reference samples associated with a plurality of neighboring blocks of the current block in the video picture; determining a first weight based on the plurality of neighboring blocks; generating a third prediction by combining the inter prediction and the first intra prediction based on the first weight; and generating a final prediction based on the plurality of neighboring reconstructed samples and the third prediction.

According to a second aspect of the present disclosure, there is provided a computing device, including: a storage medium; and one or more processors coupled to the storage medium, wherein the one or more processors are configured to perform acts comprising: obtaining one or more reference blocks associated with a current block of a video picture, wherein the one or more reference blocks are associated with one or more previously coded pictures for predicting the current block; generating an inter prediction based on one or more motion vectors from the current block to the one or more reference blocks; generating a first intra prediction based on a plurality of neighboring reconstructed reference samples associated with a plurality of neighboring blocks of the current block in the video picture; determining a first weight based on the plurality of neighboring blocks; generating a third prediction by combining the inter prediction and the first intra prediction based on the first weight; and generating a final prediction based on the plurality of neighboring reconstructed samples and the third prediction.

According to a third aspect of the present disclosure, there is provided a non-transitory computer readable storage medium storing a plurality of programs for execution by a computing device having one or more processors, wherein the plurality of programs, when executed by the one or more processors, cause the one or more processors to perform acts comprising: obtaining one or more reference blocks associated with a current block of a video picture, wherein the one or more reference blocks are associated with one or more previously coded pictures for predicting the current block; generating an inter prediction based on one or more motion vectors from the current block to the one or more reference blocks; generating a first intra prediction based on a plurality of neighboring reconstructed reference samples associated with a plurality of neighboring blocks of the current block in the video picture; determining a first weight based on the plurality of neighboring blocks; generating a third prediction by combining the inter prediction and the first intra prediction based on the first weight; and generating a final prediction based on the plurality of neighboring reconstructed samples and the third prediction.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
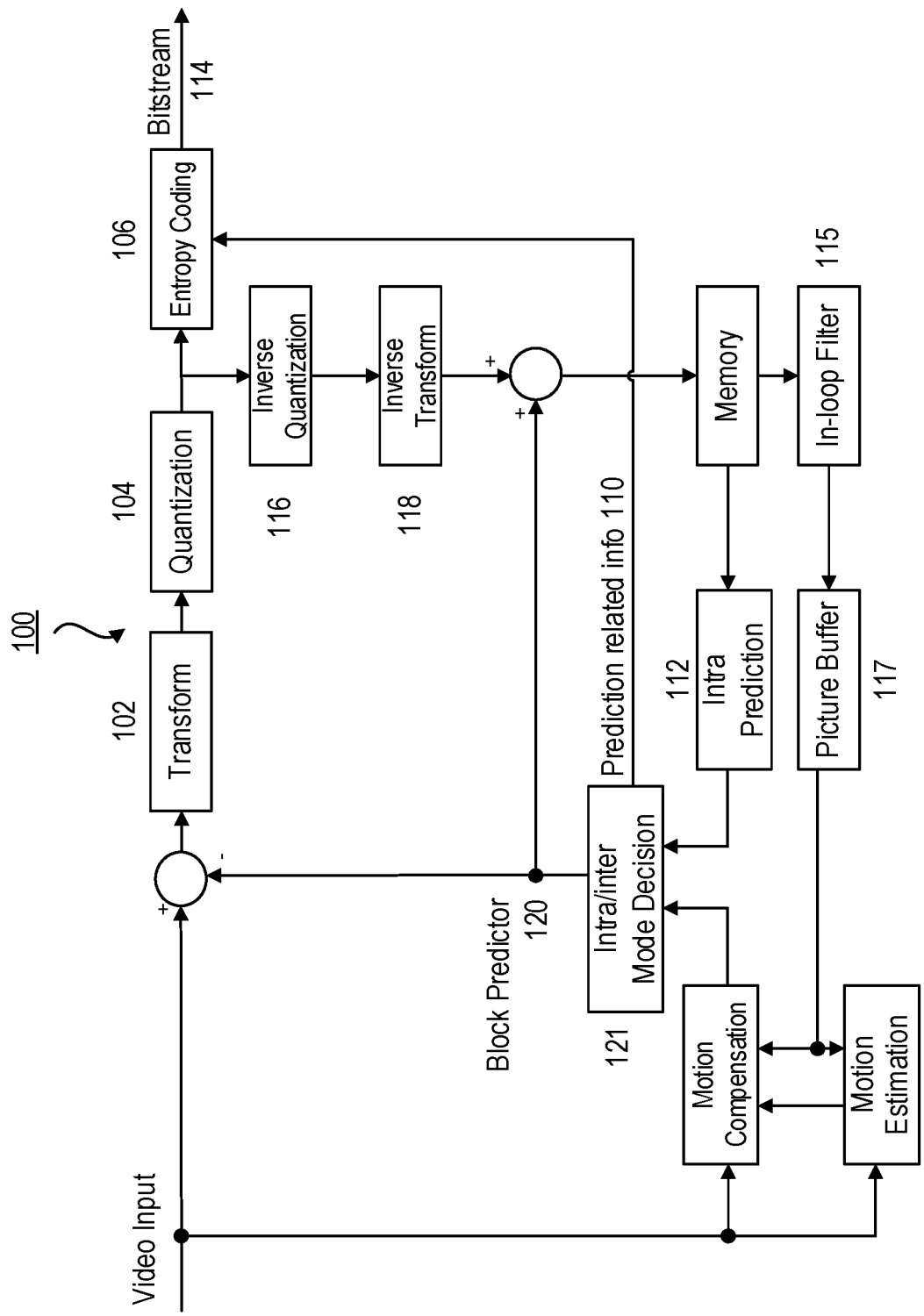
FIG. 1 is a block diagram illustrating an exemplary video encoder in accordance with some implementations of the present disclosure.
Figure 2A:
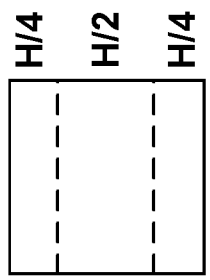
FIG. 2A shows an exemplary quaternary partitioning according to some implementations of the present disclosure.
Figure 2B:
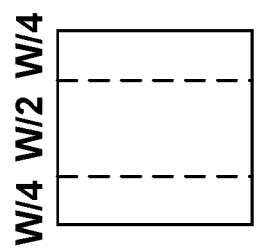
FIG. 2B shows an exemplary horizontal binary partitioning according to some implementations of the present disclosure.
Figure 2C:
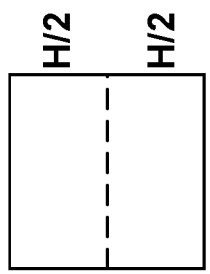
FIG. 2C shows an exemplary vertical binary partitioning according to some implementations of the present disclosure.
Figure 2D:
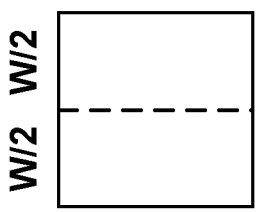
FIG. 2D shows an exemplary horizontal ternary partitioning according to some implementations of the present disclosure.
Figure 2E:
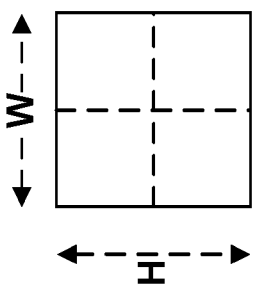
FIG. 2E shows an exemplary vertical ternary partitioning according to some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

An input video signal is processed block by block, also called coding units (CUs). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an Intra/inter Mode Decision circuitry 121 in the encoder 100 chooses the best prediction mode, for example based on the rate-distortion optimization method. The Block Predictor 120 is then subtracted from the current video block; and the resulting prediction residual is de-correlated using the Transform circuitry 102 and the Quantization Circuitry 104. The resulting quantized residual coefficients are inverse quantized by Inverse Quantization circuitry 116 and inverse transformed by the Inverse Transform circuitry 118 to form the reconstructed residual, which is then added back to the prediction block to form the reconstructed signal of the CU. Further In-loop Filtering 115, such as a deblocking filter, a sample adaptive offset (SAO), and/or an adaptive in-loop filter (ALF) may be applied on the reconstructed CU before it is put in the reference picture store of the Picture Buffer 117 and used to code future video blocks. To form the output video bitstream 114, coding mode (inter or intra), prediction mode information, motion information, and quantized residual coefficients are all sent to the Entropy Coding circuitry 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called adaptive loop filter (ALF) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

FIGS. 2A-2E show exemplary splitting types, namely, quaternary partitioning (FIG. 2A), horizontal binary partitioning (FIG. 2B), vertical binary partitioning (FIG. 2C), horizontal ternary partitioning (FIG. 2D), and vertical ternary partitioning (FIG. 2E), according to some implementations of the present disclosure.

Figure 3:
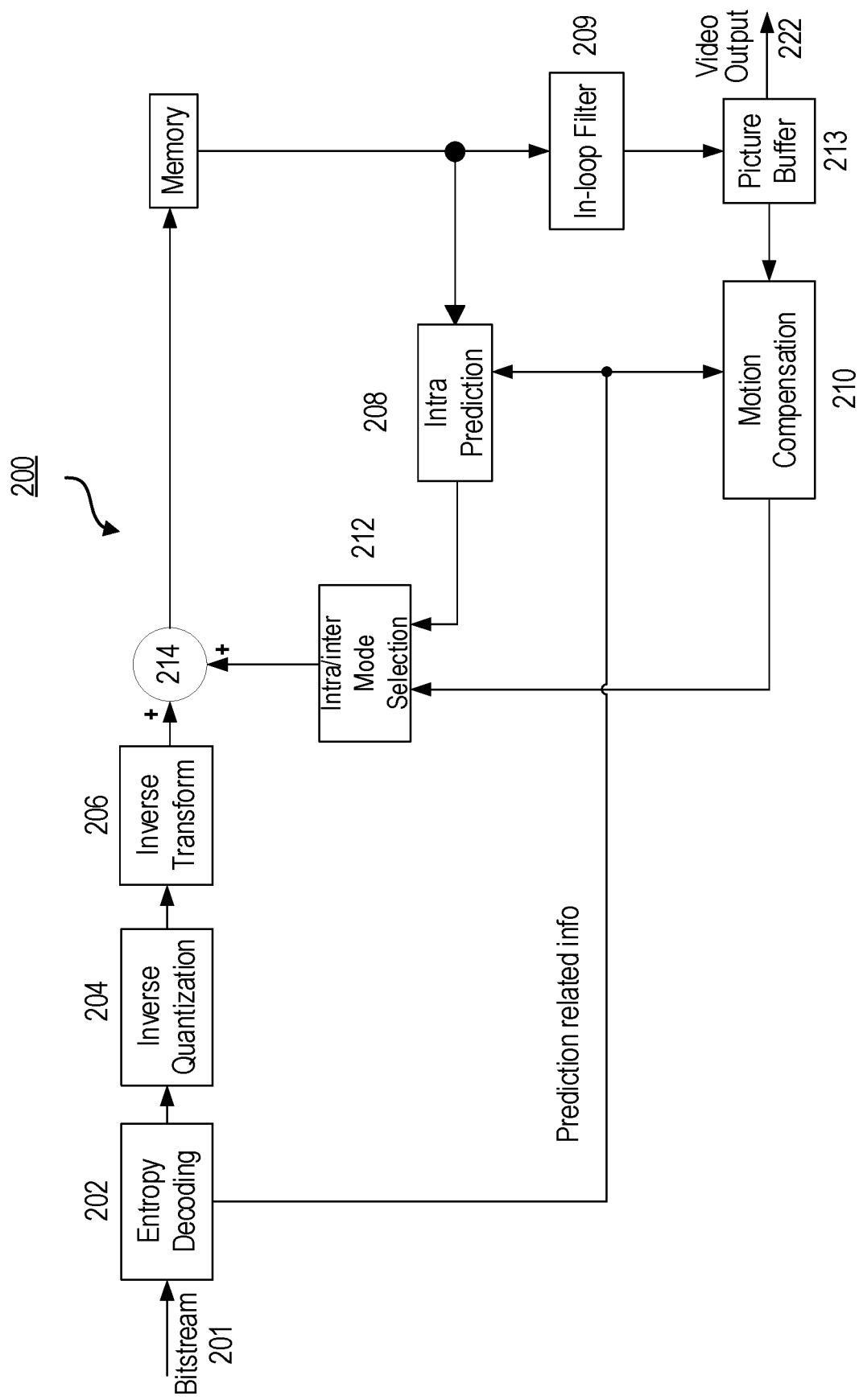
FIG. 3 is a block diagram illustrating an exemplary video decoder in accordance with some implementations of the present disclosure.

FIG. 3 shows a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Combined Inter and Intra Prediction

As shown in FIG. 1 and FIG. 3, inter and intra prediction methods are used in the hybrid video coding scheme, where each PU is only allowed to select inter prediction or intra prediction for exploiting the correlation in either temporal or spatial domain while never in both. However, the residual signal generated by inter-predicted blocks and intra-predicted blocks could present very different characteristics from each other. Therefore, if the two kinds of predictions can be combined in an efficient way, one more accurate prediction can be expected for reducing the energy of prediction residuals and therefore improving the coding efficiency.

Additionally, in nature video content, the motion of moving objects could be complicated. For example, there could exist areas which contain both old contents, for example, the objects that are included in previously coded pictures, and emerging new content, for example, the objects that are excluded in previously coded pictures. In such scenario, neither inter prediction or intra prediction can provide one accurate prediction of current block.

To further improve the prediction efficiency, combined inter and intra prediction (CIIP), which combines the intra prediction and the inter prediction of one CU that is coded by merge mode, is adopted in the VVC standard. Specifically, for each merge CU, one additional flag is signaled to indicate whether the CIIP is enabled for the current CU. For luma component, the CIIP supports four frequently-used intra modes, including planar, DC, horizontal and vertical modes. For chroma components, DM is always applied without extra signaling. For example, i.e., chroma reuses the same intra mode of luma component.

Figure 4A:
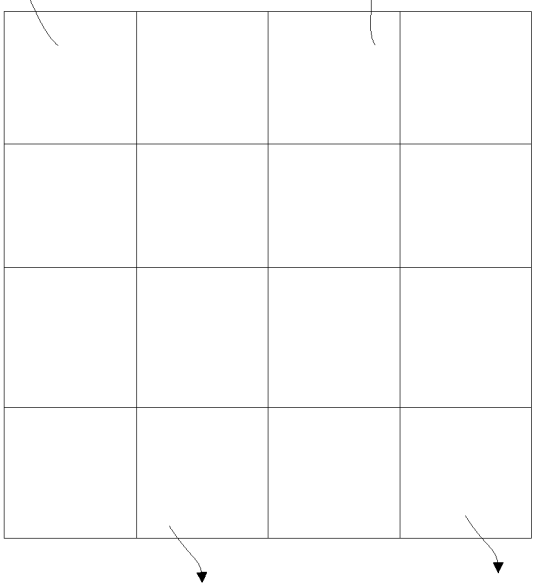
FIG. 4A illustrates combined inter and intra prediction (CIIP) in a horizontal mode in accordance with some implementations of the present disclosure.
Figure 4B:
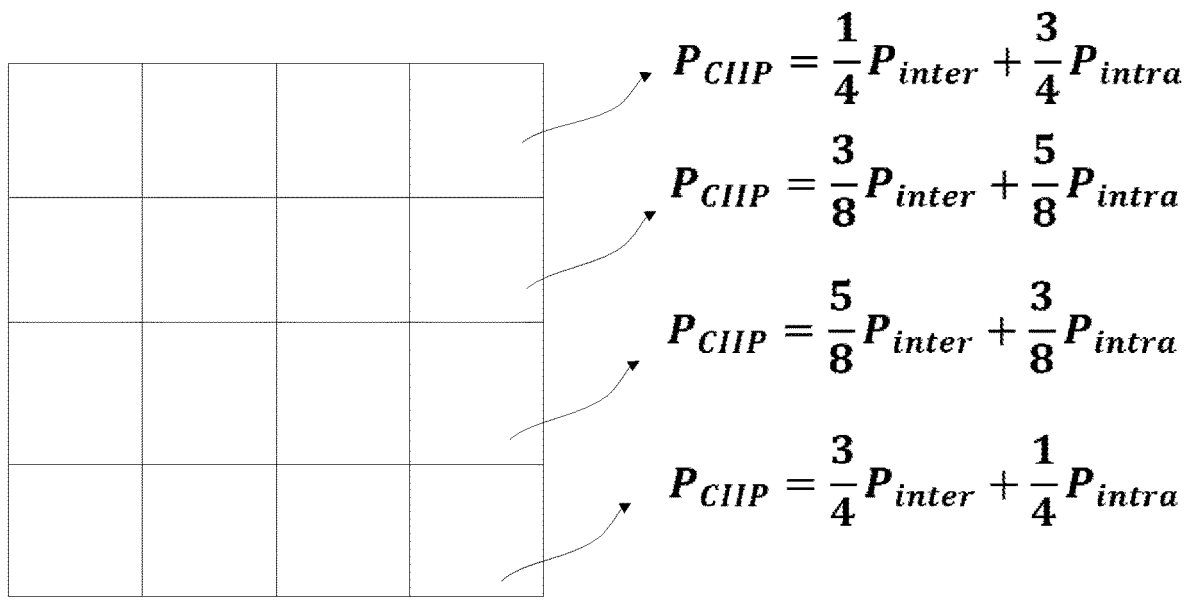
FIG. 4B illustrates CIIP in a vertical mode in accordance with some implementations of the present disclosure.
Figure 4C:
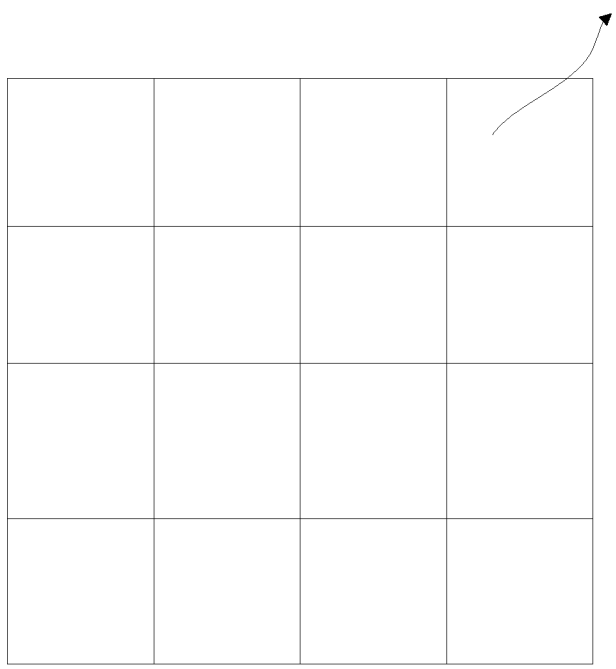
FIG. 4C illustrates CIIP in planar and DC modes in accordance with some implementations of the present disclosure.

FIGS. 4A-4C illustrate combined inter and intra prediction (CIIP) in three different modes. FIG. 4A shows a CIIP in horizontal mode. FIG. 4B shows a CIIP in vertical mode. And FIG. 4C shows CIIP in planar and DC modes. In one or more examples, weighted average is applied to combine inter prediction samples and intra prediction samples of one CIIP CU. Specifically, when a planar or DC mode is selected, equal weight, for example 0.5, is applied. Otherwise, either horizontal or vertical mode is applied. For example, the current CU is firstly split horizontally (for horizontal mode) or vertically (for vertical mode) into four equal-size areas. Four weight sets, denoted as (w_intra$_i$, w_inter$_i$), will be applied to combine the inter and intra prediction samples in different areas, where i=0 and i=3 represent the areas that are closest and furthest to the reconstructed neighboring samples used for intra prediction. In one or more examples, the values of weight sets are set as (w_intra$_0$, w_inter$_0$)=(0.75, 0.25), (w_intra$_1$, w_inter$_1$)=(0.625, 0.375), (w_intra$_2$, w_inter$_2$)=(0.375, 0.625), and (w_intra$_3$, w_inter$_3$)=(0.25, 0.75).

Figure 5A:
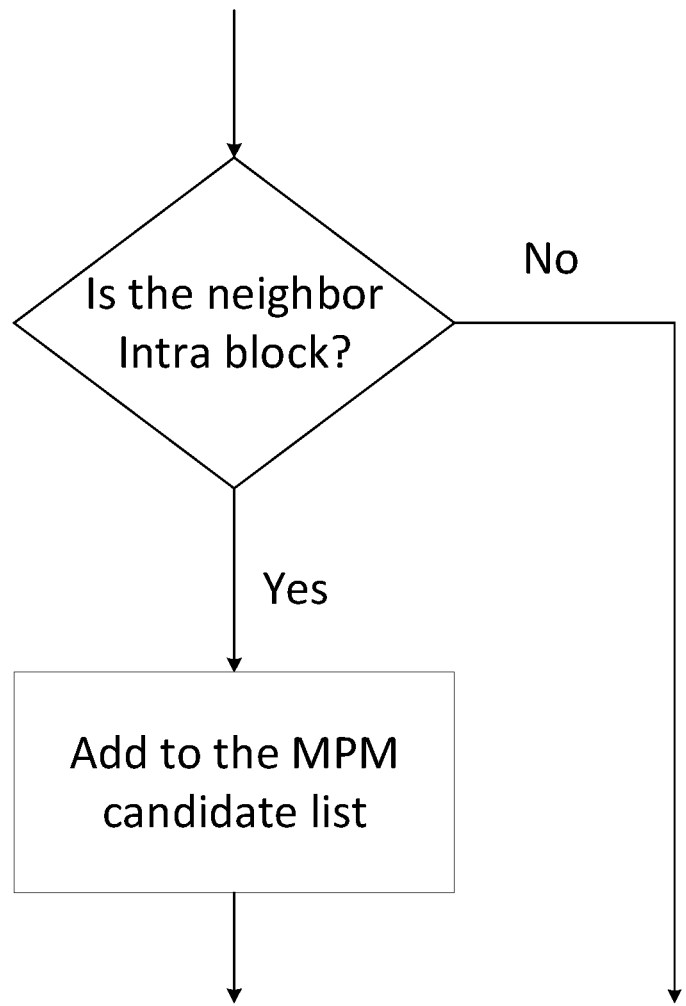
FIG. 5A is a flowchart of most probable mode (MPM) candidate list generation process of intra CUs in accordance with some implementations of the present disclosure.
Figure 5B:
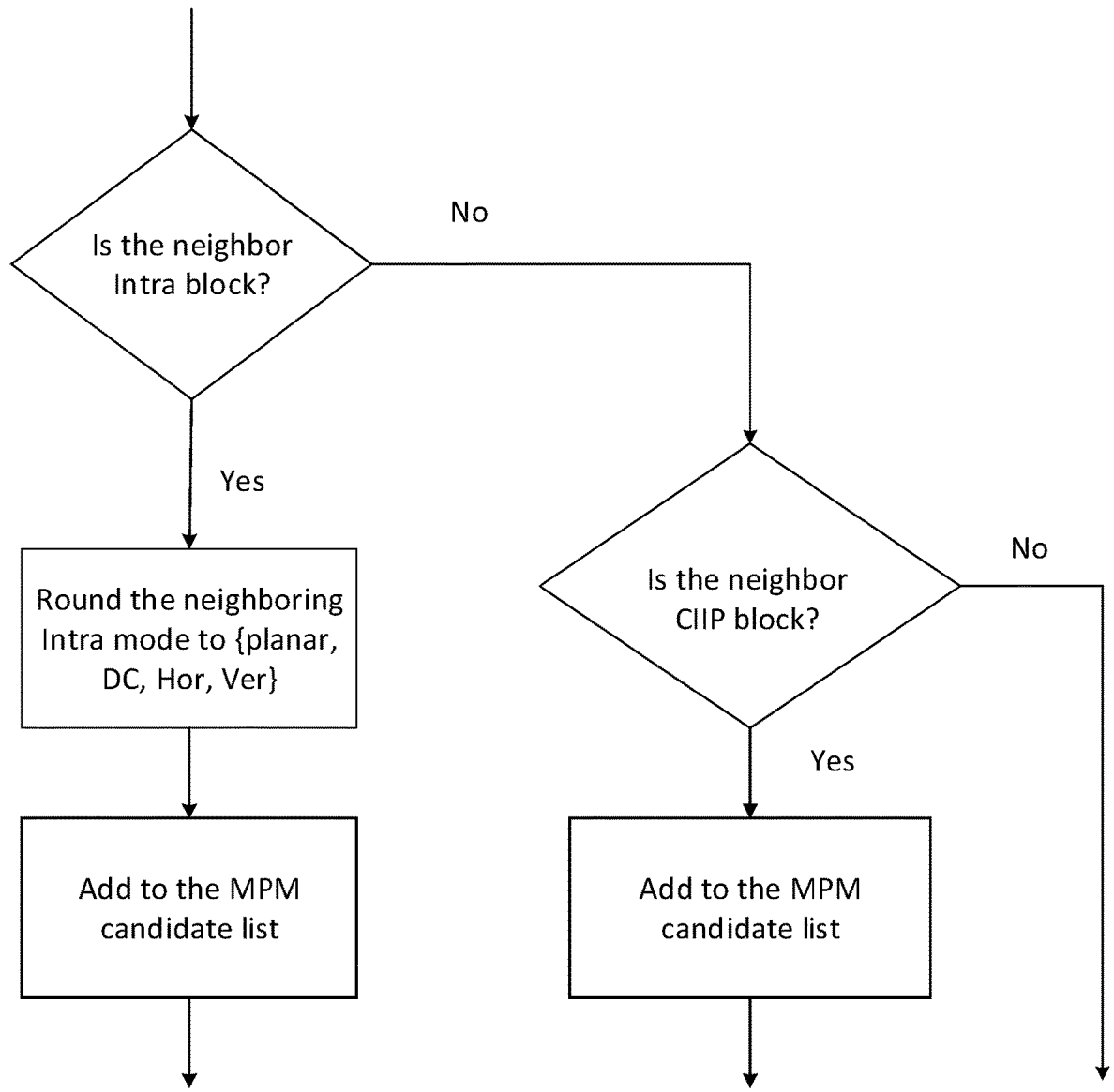
FIG. 5B is a flowchart of most probable mode (MPM) candidate list generation process of CIIP CUs in accordance with some implementations of the present disclosure.

FIG. 5A shows a flowchart of most probable mode (MPM) candidate list generation process of intra CUs. FIG. 5B shows a flowchart of most probable mode (MPM) candidate list generation process of CIIP CUs. In one or more examples, the intra mode of one CIIP CU can be used as the predictor to predict the intra mode of its neighboring CIIP CUs through MPM mechanism. Specifically, for each CIIP CU, if its neighboring blocks are also CIIP CUs, the intra modes of those neighbors are firstly rounded to the closest mode within planar, DC, horizontal and vertical modes and then added into the MPM candidate list of the current CU. However, when constructing the MPM list for each intra CU, if one of its neighboring blocks is coded by CIIP mode, it is regarded as unavailable, that is, the intra mode of one CIIP CU is disallowed to predict the intra modes of its neighboring intra CUs.

Bi-directional Optical Flow (BDOF)

Conventional bi-prediction in video coding is a simple combination of two temporal prediction blocks obtained from reference pictures that are already reconstructed. However, due to the limitation of the block-based motion compensation, there could be remaining small motion that can be observed between the samples of two prediction blocks, thus reducing the efficiency of motion compensated prediction. To solve this problem, BDOF is applied in the VVC to lower the impacts of such motion for every sample inside one block.

As shown in FIGS. 4A-4C, the BDOF is sample-wise motion refinement that is performed on top of the block-based motion-compensated predictions when bi-prediction is used. The motion refinement ($v_x$, $v_y$) of each 4×4 sub-block is calculated by minimizing the difference between L0 and L1 prediction samples after the BDOF is applied inside one 6×6 window Ω around the sub-block. Specifically, the value of ($v_x$, $v_y$) is derived as $$v_x = S_1 > 0\,?\,\text{clip3}(-th_{BDOF}, th_{BDOF}, -((S_3 \cdot 2^3) \gg \lfloor \log_2 S_1 \rfloor)): 0 \quad (1)$$

$$v_y = S_5 > 0\,?\,\text{clip3}(-th_{BDOF}, th_{BDOF},$$

$$-((S_6 \cdot 2^3 - ((v_x S_{2,m}) \ll n_{S_2} + v_x S_{2,s})/2) \gg \lfloor \log_2 S_5 \rfloor)):$$

where $\lfloor \cdot \rfloor$ is the floor function; clip3(min, max, x) is a function that clips a given value x inside the range of [min, max]; the symbol $\gg$ represents bitwise right shift operation; the symbol $\ll$ represents bitwise left shift operation; $th_{BDOF}$ is the motion refinement threshold to prevent the propagated errors due to irregular local motion, which is equal to $2^{13-BD}$, where BD is the bit-depth of input video. In equation (1) above, $$S_{2,m} = S_2 \gg n_{S_2}, S_{2,s} = S_2 \,\&\,(2^{n_{S_2}} - 1).$$

The values of $S_1$, $S_2$, $S_3$, $S_5$ and $S_6$ are calculated as $$S_1 = \sum\nolimits_{(i,j)\in\Omega} \psi_x(i,j) \cdot \psi_x(i,j), S_3 = \sum\nolimits_{(i,j)\in\Omega} \theta(i,j) \cdot \psi_x(i,j) \quad (2)$$

$$S_2 = \sum\nolimits_{(i,j)\in\Omega} \psi_x(i,j) \cdot \psi_y(i,j)$$

$$S_5 = \sum\nolimits_{(i,j)\in\Omega} \psi_y(i,j) \cdot \psi_y(i,j)\ \ S_6 = \sum\nolimits_{(i,j)\in\Omega} \theta(i,j) \cdot \psi_y(i,j)$$

where $$\psi_x(i,j) = \left(\frac{\partial I^{(1)}}{\partial x}(i,j) + \frac{\partial I^{(0)}}{\partial x}(i,j)\right) \gg 3 \quad (3)$$

$$\psi_y(i,j) = \left(\frac{\partial I^{(1)}}{\partial y}(i,j) + \frac{\partial I^{(0)}}{\partial y}(i,j)\right) \gg 3$$

$$\theta(i,j) = (I^{(1)}(i,j) \gg 6) - (I^{(0)}(i,j) \gg 6)$$

where $I^{(k)}(i, j)$ are the sample value at coordinate (i, j) of the prediction signal in list k, k=0,1, which are generated at intermediate high precision, that is, $$16\text{-bit; } \frac{\partial I^{(k)}}{\partial x}(i,j) \text{ and } \frac{\partial I^{(k)}}{\partial y}(i,j)$$

are the horizontal and vertical gradients of the sample that are obtained by directly calculating the difference between its two neighboring samples, that is, $$\frac{\partial I^{(k)}}{\partial x}(i, j) = (I^{(k)}(i+1, j) - I^{(k)}(i-1, j)) \gg 4 \quad (4)$$

$$\frac{\partial I^{(k)}}{\partial y}(i, j) = (I^{(k)}(i, j+1) - I^{(k)}(i, j-1)) \gg 4$$

Based on the motion refinement derived in equation (1) above, the final bi-prediction samples of the CU are calculated by interpolating the L0/L1 prediction samples along the motion trajectory based on the optical flow model, as indicated by $$pred_{BDOF}(x, y) = (I^{(0)}(x, y) + I^{(1)}(x, y) + b + o_{offset}) \gg shift \quad (5)$$

$$b = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right)$$

where shift and $o_{offset}$ are the right shift value and the offset value that are applied to combine the L0 and L1 prediction signals for bi-prediction, which are equal to 15−BD and 1<<(14−BD)+2·(1<<13), respectively.

Decoder-Side Motion Vector Derivation (DMVR)

DMVR is a bi-prediction technique used for merge blocks with two initially signaled MVs that can be further refined by using bilateral matching prediction. Specifically, the bilateral matching is used to derive motion information of the current CU by finding the best match between two blocks along the motion trajectory of the current CU in two different reference pictures. The cost function used in the matching process is row-subsampled sum of absolute difference (SAD).

After the matching process is done, the refined MVs are used for motion compensation in the prediction stage, temporal motion vector prediction for subsequent picture and unrefined MVs are used for the motion vector prediction between the motion vector of the current CU and that of its spatial neighbors. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Weighted Intra-Inter Prediction (WIIP)

WIIP mode was adopted into the VVC standard. The mode is signaled together with CIIP mode. When CIIP flag is true, another flag, namely WIIP flag, is further signaled to indicate whether to use WIIP mode or not. When WIIP flag is true, WIIP mode is used. Otherwise, that is when WIIP flag is false, original CIIP mode in the VVC is used.

Figure 10:
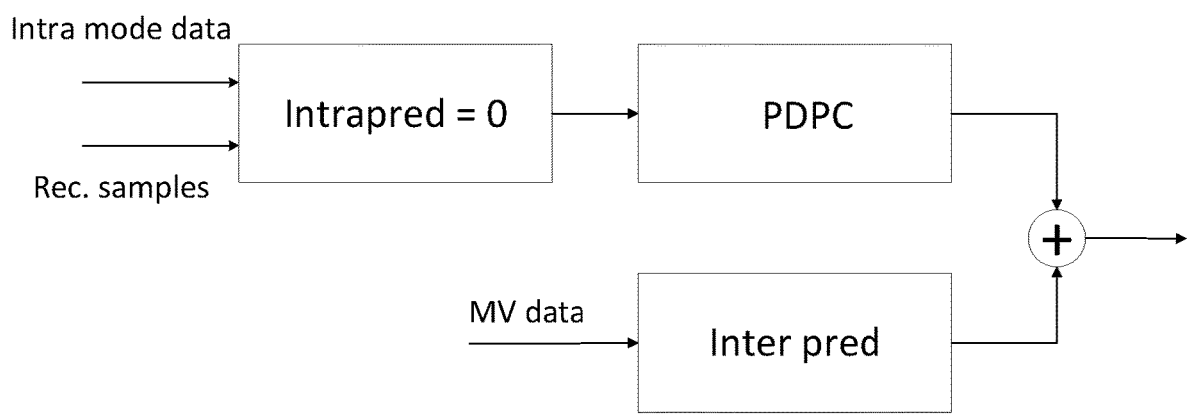
FIG. 10 is a block diagram illustrating a WIIP workflow in accordance with some implementations of the present disclosure.

FIG. 10 is a block diagram illustrating a WIIP workflow in accordance with some implementations of the present disclosure. When the WIIP is enabled, inter prediction samples are combined with unfiltered neighboring reconstructed samples in position dependent intra prediction combination (PDPC) manner. Specifically, instead of directly applying the PDPC to the inter prediction samples, one weighted intra prediction samples of the current CU are generated from the unfiltered reconstructed samples as follows:

$$predPdpc(x, y) = (WL \times R_{-1,y} + WT \times R_{x,-1} + 32) \gg 6 \quad (6)$$

where WL and WT represent weighting factors, which are the same as PDPC process, and $R_{-1,y}$ and $R_{x,-1}$ respectively represent left and above neighboring reconstructed samples. After that, the inter prediction values, denoted as predInter (x, y), and PDPC prediction, denoted as predPdpc(x, y), are combined to generate final prediction values, as shown follows:

$$FinalPred(x, y) = \quad (7)$$
$$((predPdpc(x, y) \ll 6) + (64 - WL - WT) \times predInter(x, y) + 32) \gg 6$$

In HEVC, a bi-prediction signal is generated by averaging two prediction signals obtained from two different reference pictures and/or using two different motion vectors. In the VVC, the bi-prediction mode is extended beyond simple averaging to allow weighted averaging of the two prediction signals:

$$P_{bi\text{-}pred} = ((8 - w) \times P_0 + w \times P_1 + 4) \gg 3 \quad (8)$$

where $P_0$ and $P_1$ indicate two prediction signals, and w indicates weighting factor.

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signaled after the motion vector difference; and 2) for a merge CU, the weight index is inferred from neighboring blocks based on the merge candidate index. Weighted averaging bi-prediction is only applied to CUs with 256 or more luma samples, that is, CU width times CU height is greater than or equal to 256. For low-delay pictures, all 5 weights are used. For non-low-delay pictures, only 3 weights ($w \in \{3, 4, 5\}$) are used.

Because CIIP combines the samples of inter and intra prediction, each CIIP CU needs to use its reconstructed neighboring samples to generate the prediction signal. This means that the decoding of one CIIP CU is dependent on the full reconstruction of its neighboring blocks. Due to such interdependency, for practical hardware implementations, CIIP needs to be performed in the reconstruction stage where neighboring reconstructed samples become available for intra prediction. Because the decoding of the CUs in the reconstruction stage must be performed sequentially (i.e., one by one), the number of computational operations (e.g., multiplications, additions and bit-shifts) involved in the CIIP process cannot be too high in order to ensure enough throughput of real-time decoding.

Figure 6:
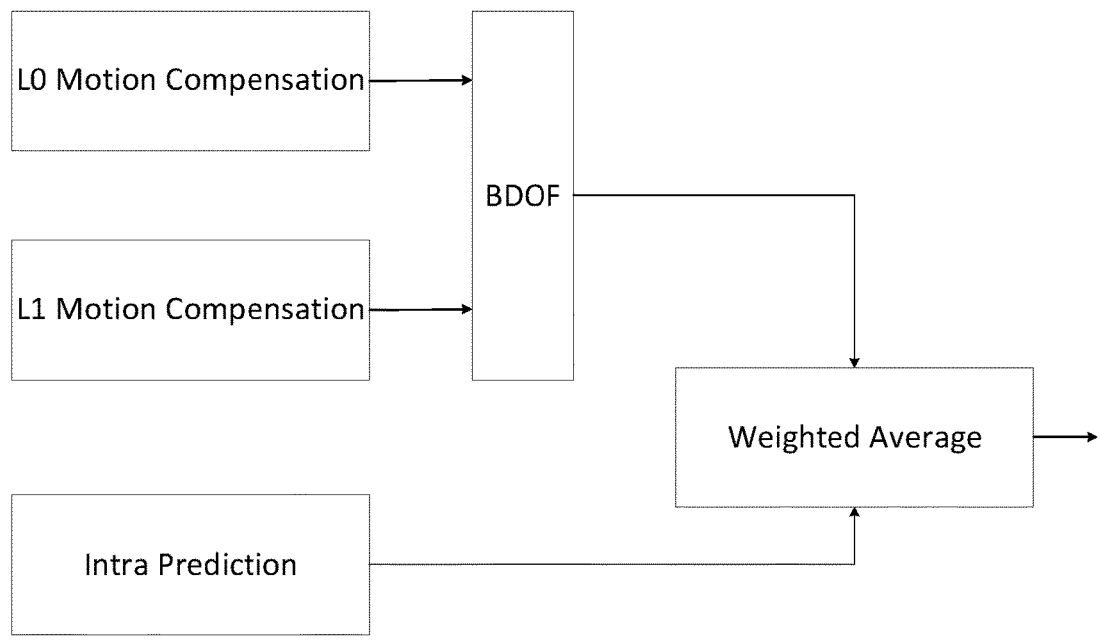
FIG. 6 is a block diagram illustrating a WIIP workflow in accordance with some implementations of the present disclosure.

BDOF is enabled to enhance the prediction quality when one inter-coded CU is predicted from two reference blocks from both forward and backward temporal directions. FIG. 6 is a block diagram illustrating generation of inter prediction samples for the CIIP mode. As shown in FIG. 6, the BDOF is involved to generate the inter prediction samples for the CIIP mode. Given additional complexity introduced by the BDOF, such design could severely lower the encoding/decoding throughput of hardware codec when the CIIP is enabled.

When one CIIP CU refers to one merge candidate that is bi-predicted, both the motion compensated prediction signals in list L0 and L1 need to be generated. When one or more MVs are not in integer precision, additional interpolation processes must be invoked to interpolate the samples at fractional sample positions. Such process not only increase the computational complexity but also increase the memory bandwidth given that more reference samples need to be accessed from external memory.

In the CIIP, the intra modes of CIIP CUs and the intra modes of intra CUs are treated differently when constructing the MPM list of their neighboring blocks. Specifically, when one current CU is coded by CIIP mode, its neighboring CIIP CUs are regarded as intra, that is, the intra modes of the neighboring CIIP CUs can be added into the MPM candidate list. However, when the current CU is coded by intra mode, its neighboring CIIP CUs are regarded as inter, that is, the intra modes of the neighboring CIIP CUs are excluded from the MPM candidate list. Such non-unified design may not be optimal for the final version of the VVC standard.

In one or more examples, methods are provided to simplify the existing CIIP design to facilitate hardware codec implementations. Generally, one aspect of this disclosure is proposed to improve the CIIP encoding/decoding throughput, and to exclude the BDOF and/or the DMVR from the generation of the inter prediction samples in the CIIP mode. Another aspect of this disclosure is to reduce the computational complexity and the memory bandwidth consumption. When one CIIP CU is bi-predicted, for example, having both L0 and L1 MVs, methods are proposed to convert the block from bi-prediction to uni-prediction for generating the inter prediction samples. It is proposed to harmonize the intra modes of CIIP and intra CUs when forming the MPM candidates of their neighboring blocks.

The CIIP Without the BDOF and/or the DMVR

The DMVR and the BDOF are always enabled to generate the inter prediction samples for the CIIP mode when the current CU is bi-predicted. Due to the additional complexity of the DMVR and the BDOF, the existing CIIP design could significantly lower the encoding/decoding throughput, especially making the real-time decoding become difficult for the VVC decoders. On the other hand, for CIIP CUs, their final prediction samples are generated by averaging the inter prediction samples and intra prediction samples. In other words, the refined prediction samples by the DMVR and the BDOF will not be directly used as the prediction signal for CIIP CUs. Therefore, compared to the conventional bi-predicted CUs (where the DMVR and the BDOF are directly applied to generate the prediction samples), the corresponding improvement obtained from either the DMVR or the BDOF is less efficient for CIIP CUs. Therefore, based on the above considerations, it is proposed to disable both the DMVR and the BDOF when generating the inter prediction samples of the CIIP mode.

Figure 7:
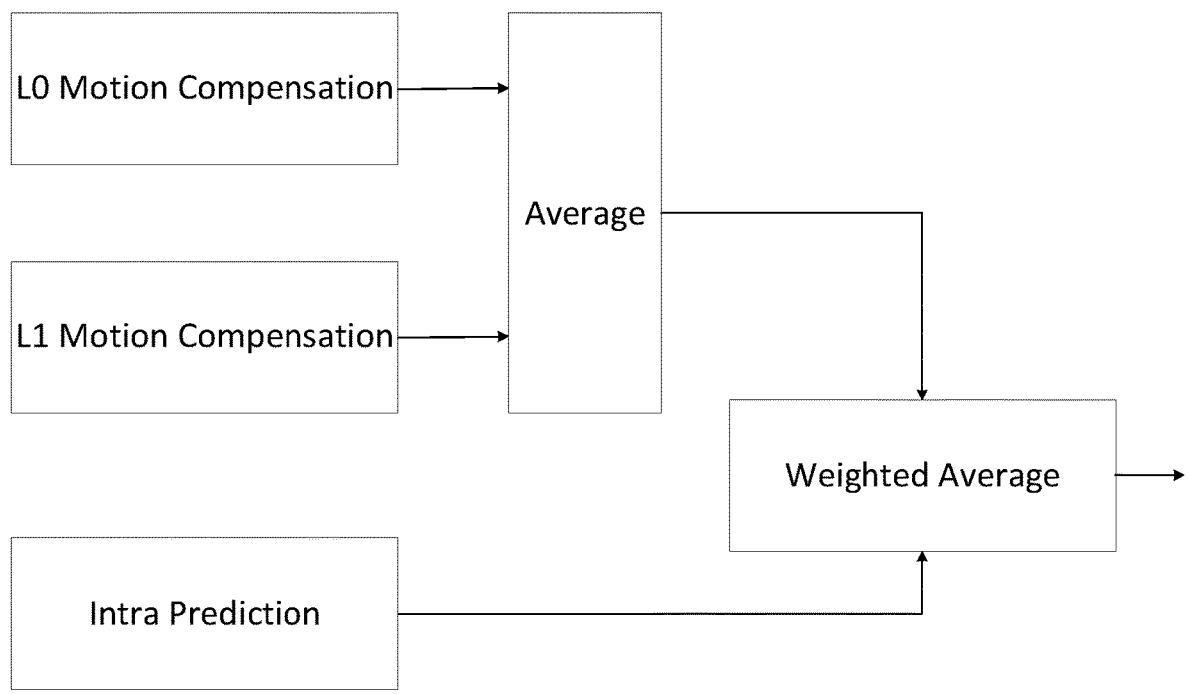
FIG. 7 is a block diagram illustrating a corresponding workflow of a CIIP process after removing bi-directional optical flow (BDOF) in accordance with some implementations of the present disclosure.

FIG. 7 is a block diagram illustrating a corresponding workflow of a CIIP process after removing the BDOF in accordance with some implementations of the present disclosure. In some examples, the BDOF is disabled but the DMVR is enabled for the generation of the inter prediction samples of the CIIP mode. In some examples, the DMVR is disabled but the BDOF is enabled for the generation of the inter prediction samples of the CIIP mode.

The CIIP Based on Uni-Prediction

When the merge candidate that is referred by one CIIP CU is bi-predicted, both the L0 and L1 prediction signals are generated to predict the samples inside the CU. To reduce the memory bandwidth and the interpolation complexity, in some examples, it is proposed to only use the inter prediction samples that are generated using uni-prediction, even when the current CU is bipredicted, to be combined with the intra prediction samples in the CIIP mode.

Specifically, if the current CIIP CU is uni-predicted, the inter prediction samples will be directly combined with the intra prediction samples. Otherwise, when the current CU is bi-predicted, the inter prediction samples that are used by the CIIP are generated based on the uni-prediction from one prediction list, either L0 or L1.

To select the prediction list, different methods may be applied. In one or more examples, it is proposed to always select the first prediction, for example, list L0, for any CIIP block that are predicted by two reference pictures.

In one or more examples, it is proposed always select the second prediction, for example, list L1, for any CIIP block that are predicted by two reference pictures.

Figure 8:
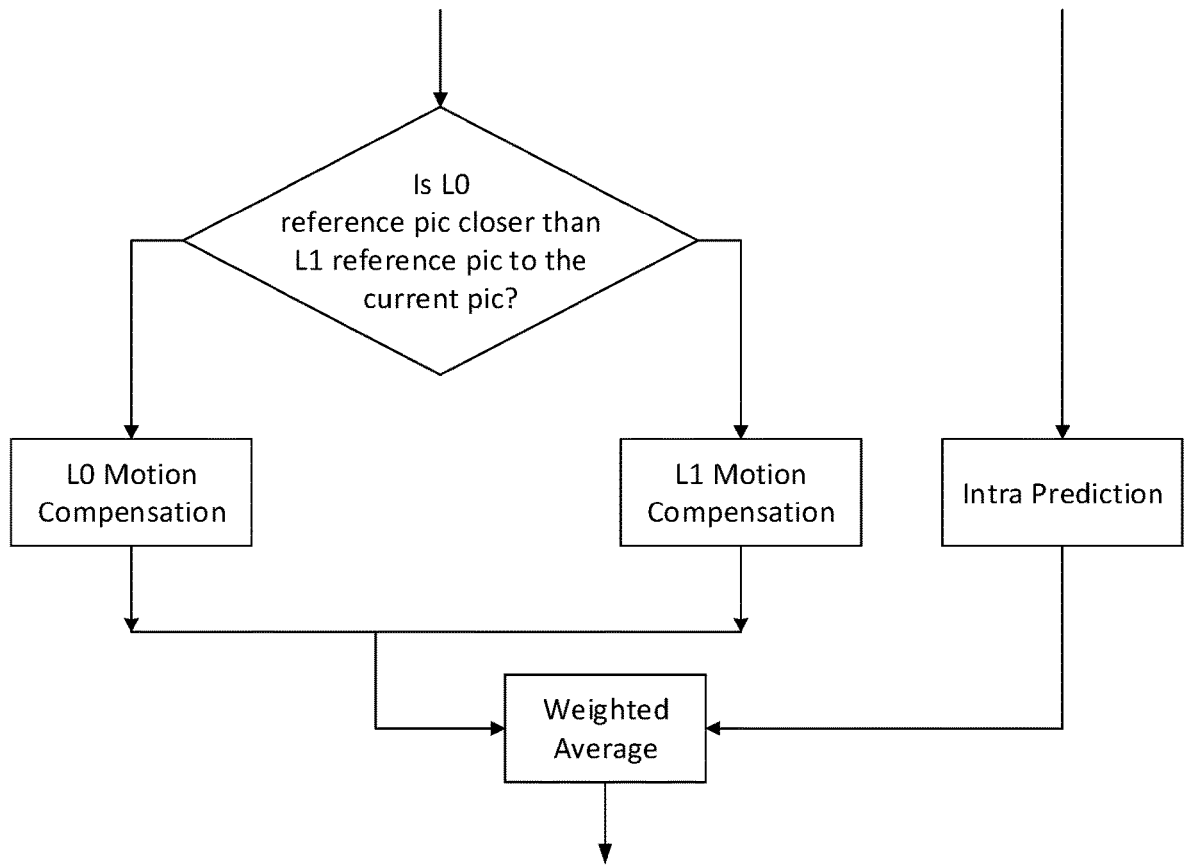
FIG. 8 is a flow chart illustrating a workflow of the uni-prediction based CIIP with selecting the prediction list based on picture order count (POC) distance in accordance with some implementations of the present disclosure.

FIG. 8 is a flow chart illustrating a workflow of the uni-prediction based CIIP with selecting the prediction list based on picture order count (POC) distance. In one or more examples, one adaptive method is applied where the prediction list that is associated with one reference picture with smaller picture order count (POC) distance from the current picture is selected.

In one or more examples, only the CIIP mode is enabled when the current CU is un-predicted.

Moreover, to reduce the overhead, the signaling of the CIIP enabling/disabling flag is dependent on the prediction direction of the current CIIP CU. If the current CU is uni-predicted, the CIIP flag will be signaled in bit-stream to indicate whether the CIIP is enabled or disabled. Otherwise, that is when the current CU is bi-predicted, the signaling of the CIIP flag will be skipped and is always inferred as false, for example, the CIIP is always disabled.

The Complexity Reduction of the WIIP Mode

Given that both the CIIP and WIIP are designed based on the concept on weighted combination of inter and intra prediction samples, all the complexity/latency reduction methods that are proposed for the CIIP can be naturally extended to the WIIP mode.

In one or more examples, the DMVR mode is disabled when generating the inter prediction samples for the WIIP mode.

In one or more examples, the DMVR and the BDOF are disabled when generating the inter prediction samples of the WIIP mode. Specifically, the L0 and L1 prediction samples are firstly generated; then without waiting for the DMVR and BDOF process to be finished, the original L0 and L1 prediction samples are combined based on the weights as indicated by the BCW index.

In one or more examples, DMVR, BDOF and BCW are disabled to generate the inter prediction samples of the WIIP mode. Specifically, the original L0 and L1 prediction samples are directly combined based on the equal weight, for example, without BCW. Then, the averaged signal is used as the inter prediction samples to be combined with PDPC-based intra prediction samples when the WIIP mode is enabled.

In one or more examples, only the inter prediction samples that are generated using uni-prediction, even when the current CU is bi-predicted, are combined with the PDPC-based intra prediction samples in the WIIP mode.

Specifically, if the inter part of one WIIP CU is un-predicted, the inter prediction samples will be directly combined with the PDPC samples. Otherwise, that is when the current CU is bi-predicted, the inter prediction samples that are used by the WIIP are generated based on the uniprediction from one prediction list, for example, either L0 or L1.

To select the prediction list, different methods may be applied. In one or more examples, a first prediction, for example, list L0, is always selected for any WIIP block that are predicted by two reference pictures.

In one or more examples, a second prediction, for example, list L1, is always selected for any CIIP block that are predicted by two reference pictures.

In one or more examples, one adaptive method is applied where the prediction list that is associated with one reference picture with smaller picture order count (POC) distance from the current picture is selected.

Harmonization of Intra Modes of CIIP and Intra CUs for MPM Candidate List Construction CIIP CUs and intra CUs to form the MPM candidate list of their neighboring blocks. Specifically, both the intra modes of CIIP CUs and intra CUs can predict the intra modes of their neighboring blocks that are coded in the CIIP mode. However, only the intra modes of intra CUs can predict the intra modes of intra CUs.

Figure 9A:
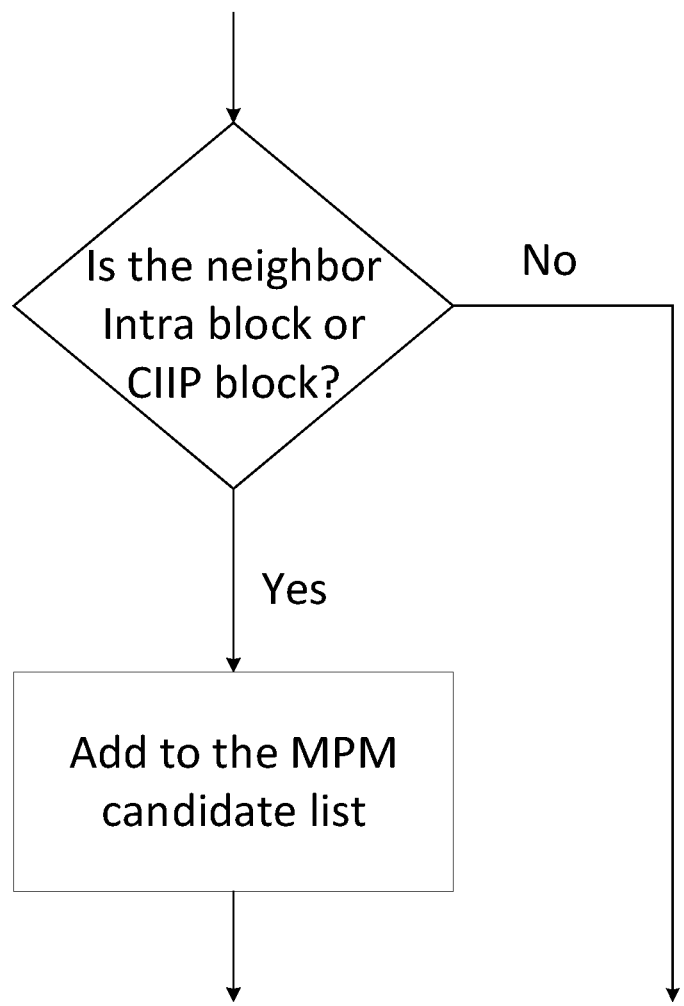
FIG. 9A is a flow chart illustrating generating the MPM candidate list by enabling CIIP blocks in accordance with some implementations of the present disclosure.
Figure 9B:
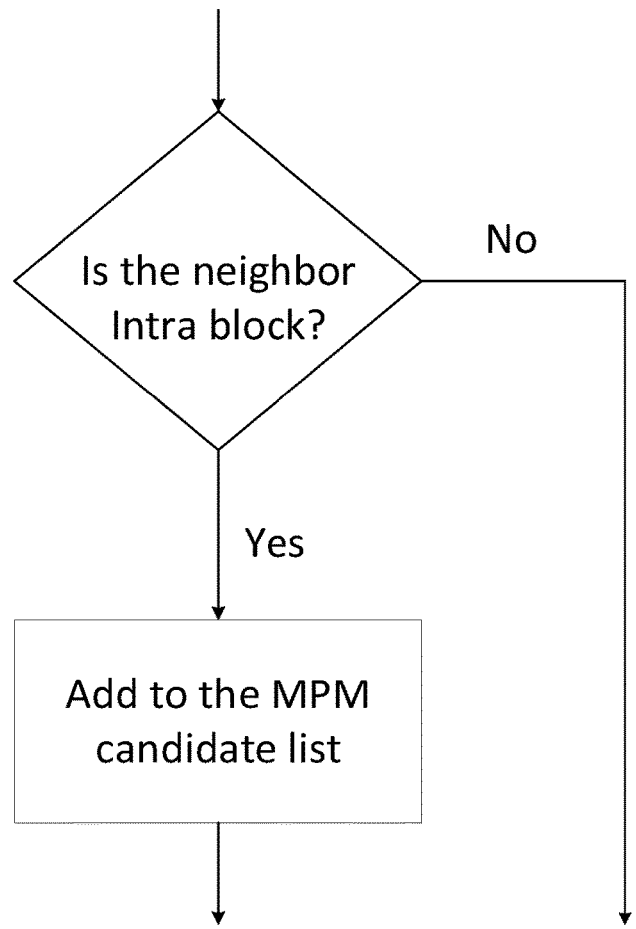
FIG. 9B is a flow chart illustrating generating the MPM candidate list by disabling CIIP blocks in accordance with some implementations of the present disclosure.

To achieve one more unified design, two methods are proposed to harmonize the usage of the intra modes of CIIP and intra CUs for MPM list construction. FIGS. 9A-9B show generation process of the MPM candidate list. FIG. 9A is a flow chart illustrating generating the MPM candidate list by enabling CIIP blocks. FIG. 9B is a flow chart illustrating generating the MPM candidate list by disabling CIIP blocks.

In one or more examples, the CIIP mode is treated as inter mode for the MPM list construction. Specifically, when generating the MPM list of either one CIIP CU or one intra CU, if its neighboring block is coded in the CIIP mode, the intra mode of the neighboring block is marked as unavailable. As a result, no intra modes of CIIP blocks can be used to construct the MPM list.

In one or more examples, the CIIP mode is treated as intra mode for the MPM list construction. Specifically, the intra modes of CIIP CUs can predict the intra modes of both its neighboring CIIP blocks and intra blocks.

Harmonization between the CIIP Mode and the WIIP Mode

For the CIIP mode, the intra prediction samples that are generated from the planar intra prediction and PDPC are combined with the inter prediction samples based on constant weight, for example, the weights that are applied to combine the intra and inter prediction samples are equal for all the samples inside the current CU.

For the WIIP mode, the weights that are applied to combine intra and inter prediction samples are dependent on the horizontal and vertical distance of one prediction samples position to its corresponding left and top reconstructed neighboring samples, for example, WL and WT. Therefore, in order to align the combination process of the CIIP and WIIP modes, the CIIP intra/inter combination process is modified to be aligned with that of the WIIP mode, for example, to use sample variant weights to combine intra and inter prediction samples.

In one or more examples, the original intra prediction samples are firstly combined with the inter prediction samples based on an existing CIIP weight. In some examples, the original intra prediction samples may be the intra prediction samples generated from planar mode. The existing CIIP weight may be determined based on the left and top neighbors of the current CU. Specifically, the original intra prediction samples are firstly combined with the inter prediction samples based on the existing CIIP weight by using following equation (9):

$$predCombl(x, y) = ((4 - W_{ciip}) \times P_{inter} + W_{ciip} \times P_{intra} + 2) \gg 2 \quad (9)$$

where (x, y) indicates a position of a sample in the current block, predCombl(x, y) indicates a combined prediction associated with the sample at the position, $W_{ciip}$ indicates a CIIP weight, $P_{inter}$ indicates the inter prediction, Pintra indicates the original intra prediction, and >> indicates a bitwise right shift operator.

After that, the final prediction samples are generated by applying the PDPC to the combined prediction samples based on the reconstructed left and top neighboring reconstructed samples. For example, the final prediction samples are generated by following equation (10):

$$FinalPred(x, y) = \quad (10)$$
$$((predCombl(x, y) \ll 6) + WL \times R_{-1,y} + WT \times R_{x,-1} + 32) \gg 6$$

where (x, y) indicates the position of the sample in the current block, predCombl(x, y) indicates the combined prediction associated with the sample at the position, WL and WT represent weighting factors of the PDPC mode, and $R_{-1,y}$ and $R_{x,-1}$ represent left and above neighboring reconstructed samples, and << and >> respectively indicate a bitwise left and right shift operator.

Therefore, the PDPC is applied at the last stage of the CIIP stage, thus increasing the encoding/decoding latency of the CIIP. In order to reduce the latency, the PDPC may be separated into two individual parts.

Figure 11:
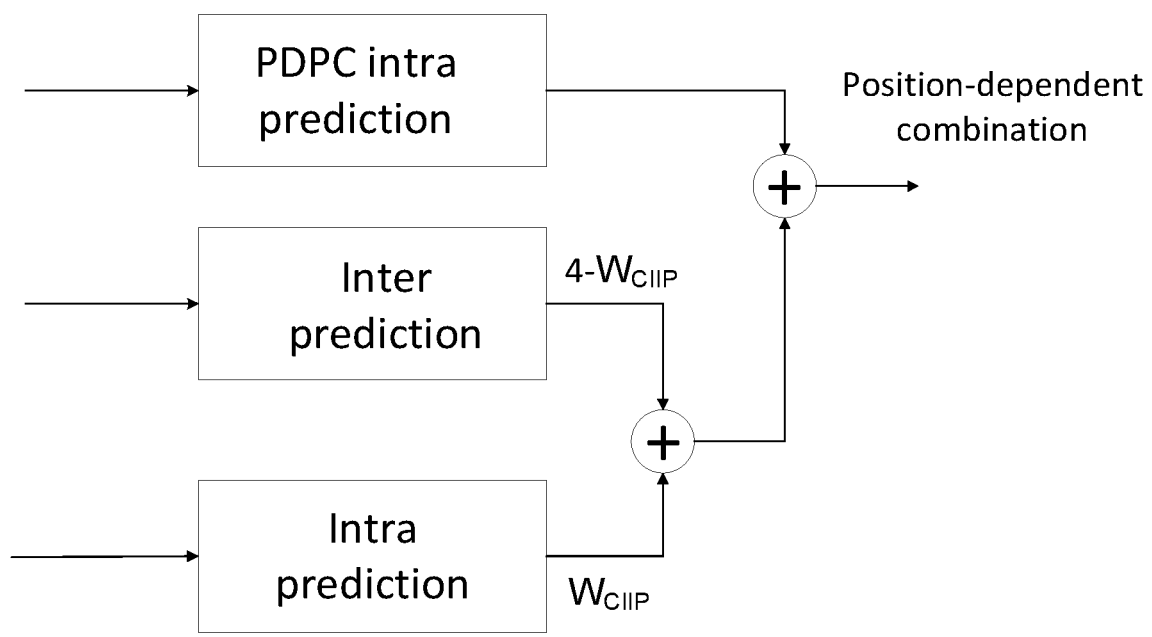
FIG. 11 is a block diagram illustrating separating the position dependent intra prediction combination (PDPC) into two individual parts in accordance with some implementations of the present disclosure.

FIG. 11 is a block diagram illustrating separating the PDPC into two individual parts in accordance with some implementations of the present disclosure.

In one or more examples, an intra prediction part is firstly generated from the neighboring reconstructed samples of the PDPC, and then a second part further combines the intra prediction samples of the PDPC (that is, the first part) and the combined intra/inter prediction in the PDPC manner. Then, another intra prediction signal based on the PDPC is generated from the reconstructed neighboring samples. Finally, two prediction signals are combined to generate a final prediction signal.

Specifically, the original intra prediction samples may be the intra prediction samples generated from planar mode. The intra prediction samples, denoted as $P_{intra}$ below, are combined with the inter prediction samples, denoted as $P_{inter}$ below, based on an existing CIIP weight $W_{ciip}$ by using following equation (11):

$$predCombl(x, y) = ((4 - W_{ciip}) \times P_{inter} + W_{ciip} \times P_{intra} + 2) \gg 2 \quad (11)$$

where (x, y) indicates a position of a sample in the current block, predCombl(x, y) indicates a combined prediction associated with the sample at the position, $W_{ciip}$ indicates a CIIP weight, $P_{inter}$ indicates the inter prediction, $P_{intra}$ indicates the original intra prediction, and >> indicates a bitwise right shift operator.

Additionally, another intra prediction signal based on the PDPC is generated from reconstructed neighboring samples and neighboring weights. Specifically, the reconstructed neighboring samples may comprise a left neighboring reconstructed reference sample, and a top neighboring reconstructed reference sample; and the neighboring weights may comprise a left neighboring weight and a top neighboring weight. The intra prediction signal may be generated by following equation (12):

$$predPdpc(x, y) = (WL \times R_{-1,y} + WT \times R_{x,-1} + 32) \gg 6 \qquad (12)$$

where (x, y) indicates the position of the sample in the current block, predPdpc(x, y) indicates the combined prediction associated with the sample at the position, $R_{-1,y}$ indicates the left neighboring reconstructed reference sample, $R_{x,-1}$ indicates the top neighboring reconstructed reference sample, WL indicates the left neighboring weight, WT indicates the top neighboring weight, and $\gg$ indicates a bitwise right shift operator.

Finally, a final prediction signal is generated by combining the two prediction signals generated above based on the two neighboring weights. Specifically, the final prediction signal may be generated by using following equation (13):

$$FinalPred(x, y) = ((predPdpc(x, y) \ll 6) + \qquad (13)$$
$$(64 - WL - WT) \times predCombl(x, y) + 32) \gg 6$$

In some examples, although default CIIP weight is used to combine the original intra and inter prediction samples, other weight values can also be used for this combination purpose.

In some examples, after the above CIIP/WIIP unification method is applied, the only difference between the CIIP and the WIIP is that whether the normal intra prediction signal is involved in the generation of the final prediction samples. For the WIIP, the normal intra prediction samples are used for the WIIP prediction sample derivation, for example, setting $W_{ciip}$ to be 0. For the CIIP, the normal intra prediction samples are used for the CIIP prediction samples, for example, $W_{ciip}$ is set to non-zero.

Therefore, one flag may be signaled to tell whether the CIIP mode or the WIIP mode is applied. When the flag is equal to 0, $W_{ciip}$ is derived by the existing CIIP weight derivation method, for example, $W_{ciip}$ is set to non-zero. Otherwise, when the flag is equal to 0, the value of $W_{ciip}$ is set to 0 such that the normal intra prediction samples are involved to derive the final prediction samples.

In one or more examples, original inter and intra prediction samples are firstly combined based on $W_{ciip}$. And then final prediction samples are generated from the combined samples based reconstructed neighboring samples and weights. Specifically, the reconstructed neighboring samples may comprise a left neighboring reconstructed reference sample, and a top neighboring reconstructed reference sample; and the weights may comprise a left neighboring weight, a top neighboring weight, and the CIIP weight $W_{ciip}$.

Specifically, the original inter and intra prediction samples are firstly combined based on $W_{ciip}$ by using following equation (14):

$$predCombl(x, y) = ((4 - W_{ciip}) \times P_{inter} + W_{ciip} \times P_{intra} + 2) \gg 2 \qquad (14)$$

and then the final prediction samples are generated by using following equation (15):

$$FinalPred(x, y) = ((predCombl(x, y) \ll 8) + \qquad (15)$$
$$W_{ciip} \times WL \times R_{-1,y} + W_{ciip} \times WT \times R_{x,-1} + 128) \gg 8$$

where (x, y) indicates a position of a sample in the current block, FinalPred(x, y) indicates the final prediction associated with the sample at the position, predCombl(x, y) indicates a combined prediction associated with the sample at the position, $W_{ciip}$ indicates a CIIP weight, WL indicates the left neighboring weight, WT indicates the top neighboring weight, $R_{-1,y}$ indicates the left neighboring reconstructed reference sample, $R_{x,-1}$ indicates the top neighboring reconstructed reference sample, $\ll$ indicates a bitwise left shift operator, $\gg$ indicates the bitwise right shift operator, $P_{inter}$ indicates the inter prediction samples, and $P_{intra}$ indicates the intra prediction samples.

In one or more examples, the WIIP intra/inter combination process is aligned as the same as that of the CIIP mode. For example, a constant weight is used to do the intra and inter sample combination. Intra prediction samples of a WIIP CU are first generated based on the left neighboring reconstructed reference sample, the top neighboring reconstructed reference sample, the CIIP weight, the left neighboring weight, and the top neighboring weight. Inter prediction samples of the WIIP CU are generated based on the CIIP weight, the left neighboring weight, and the top neighboring weight. Then, final prediction samples of the WIIP CU are generated by combining the intra prediction samples and the inter prediction samples generated above based on the CIIP weight.

Specifically, the intra prediction samples of the WIIP CU are generated by using following equation (16):

$$predPdpc(x, y) = (WL \times R_{-1,y} + WT \times R_{x,-1}) / W_{ciip} \qquad (16)$$

and the inter prediction samples of the WIIP CU are generated by using following equation (17):

$$predInter(x, y) = (64 - WL - WT) / (4 - W_{ciip}) \times P_{inter}(x, y) \qquad (17)$$

Finally, the final prediction samples of the WIIP CU are generated by using following equation (18):

$$FinalPred(x, y) = \qquad (18)$$
$$((4 - W_{ciip}) \times predInter(x, y) + W_{ciip} \times predPdpc(x, y) + 32) \gg 6$$

Here, (x, y) indicates a position of a sample in the current block, WL indicates a left neighboring weight, WT indicates a top neighboring weight, $R_{-1,y}$ indicates a left neighboring reconstructed reference sample of the sample at the position, $R_{x,-1}$ indicates a top neighboring reconstructed reference sample of the sample at the position, $W_{ciip}$ indicates a CIIP weight, $P_{inter}(x, y)$ indicates the inter prediction associated with the sample at the position, FinalPred(x, y) indicates the final prediction associated with the sample at the position, predInter(x, y) indicates the inter prediction associated with the sample at the position, predPdpc(x, y) indicates the first intra prediction associated with the sample at the position, and >> indicates a bitwise right shift operator.

Figure 12:
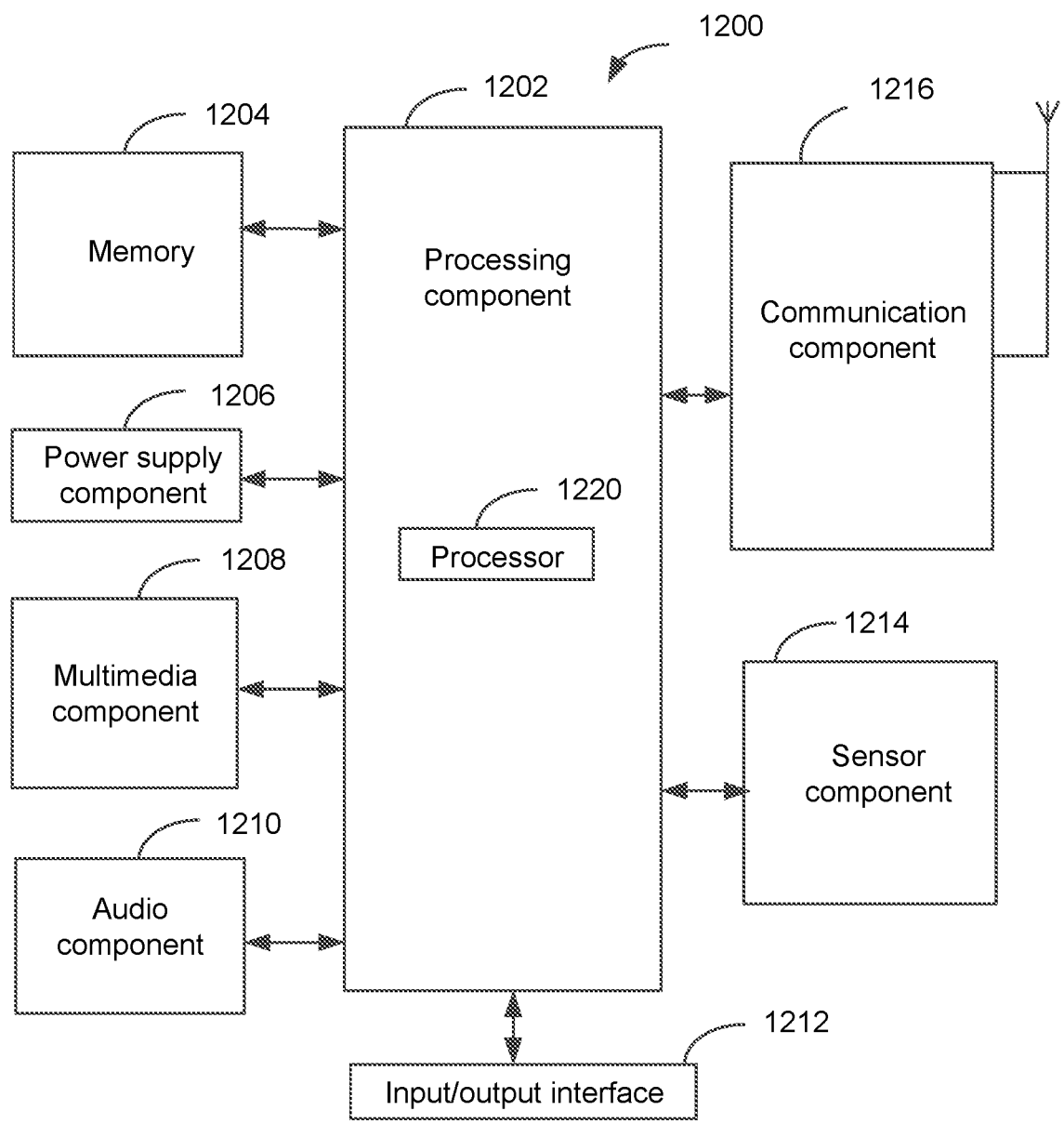
FIG. 12 is a block diagram illustrating a computing device for video coding in accordance with some implementations of the present disclosure.

FIG. 12 is a block diagram illustrating a computing device for video coding in accordance with some implementations of the present disclosure. The apparatus 1200 may be a terminal, such as a mobile phone, a tablet computer, a digital broadcast terminal, a tablet device, or a personal digital assistant.

As shown in FIG. 12, the computing device 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 usually controls overall operations of the computing device 1200, such as operations relating to display, a telephone call, data communication, a camera operation and a recording operation. The processing component 1202 may include one or more processors 1220 for executing instructions to complete all or a part of steps of the above method. Further, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store different types of data to support operations of the computing device 1200. Examples of such data include instructions, contact data, phonebook data, messages, pictures, videos, and so on for any application or method that operates on the computing device 1200. The memory 1204 may be implemented by any type of volatile or non-volatile storage devices or a combination thereof, and the memory 1204 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1206 supplies power for different components of the computing device 1200. The power supply component 1206 may include a power supply management system, one or more power supplies, and other components associated with generating, managing and distributing power for the computing device 1200.

The multimedia component 1208 includes a screen providing an output interface between the computing device 1200 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1208 may include a front camera and/or a rear camera. When the computing device 1200 is in an operation mode, such as a shooting mode or a video mode, the front camera and/or the rear camera may receive external multimedia data.

The audio component 1210 is configured to output and/or input an audio signal. For example, the audio component 1210 includes a microphone (MIC). When the computing device 1200 is in an operating mode, such as a call mode, a recording mode and a voice recognition mode, the microphone is configured to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, a button, or the like. These buttons may include but not limited to, a home button, a volume button, a start button and a lock button.

The sensor component 1214 includes one or more sensors for providing a state assessment in different aspects for the computing device 1200. For example, the sensor component 1214 may detect an on/off state of the computing device 1200 and relative locations of components. For example, the components are a display and a keypad of the computing device 1200. The sensor component 1214 may also detect a position change of the computing device 1200 or a component of the computing device 1200, presence or absence of a contact of a user on the computing device 1200, an orientation or acceleration/deceleration of the computing device 1200, and a temperature change of computing device 1200. The sensor component 1214 may include a proximity sensor configured to detect presence of a nearby object without any physical touch. The sensor component 1214 may further include an optical sensor, such as a CMOS or CCD image sensor used in an imaging application. In some examples, the sensor component 1214 may further include an acceleration sensor, a gyroscope sensor, a magnetic sensor, a pressure sensor, or a temperature sensor.

The communication component 1216 is configured to facilitate wired or wireless communication between the computing device 1200 and other devices. The computing device 1200 may access a wireless network based on a communication standard, such as WiFi, 4G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the computing device 1200 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 13:
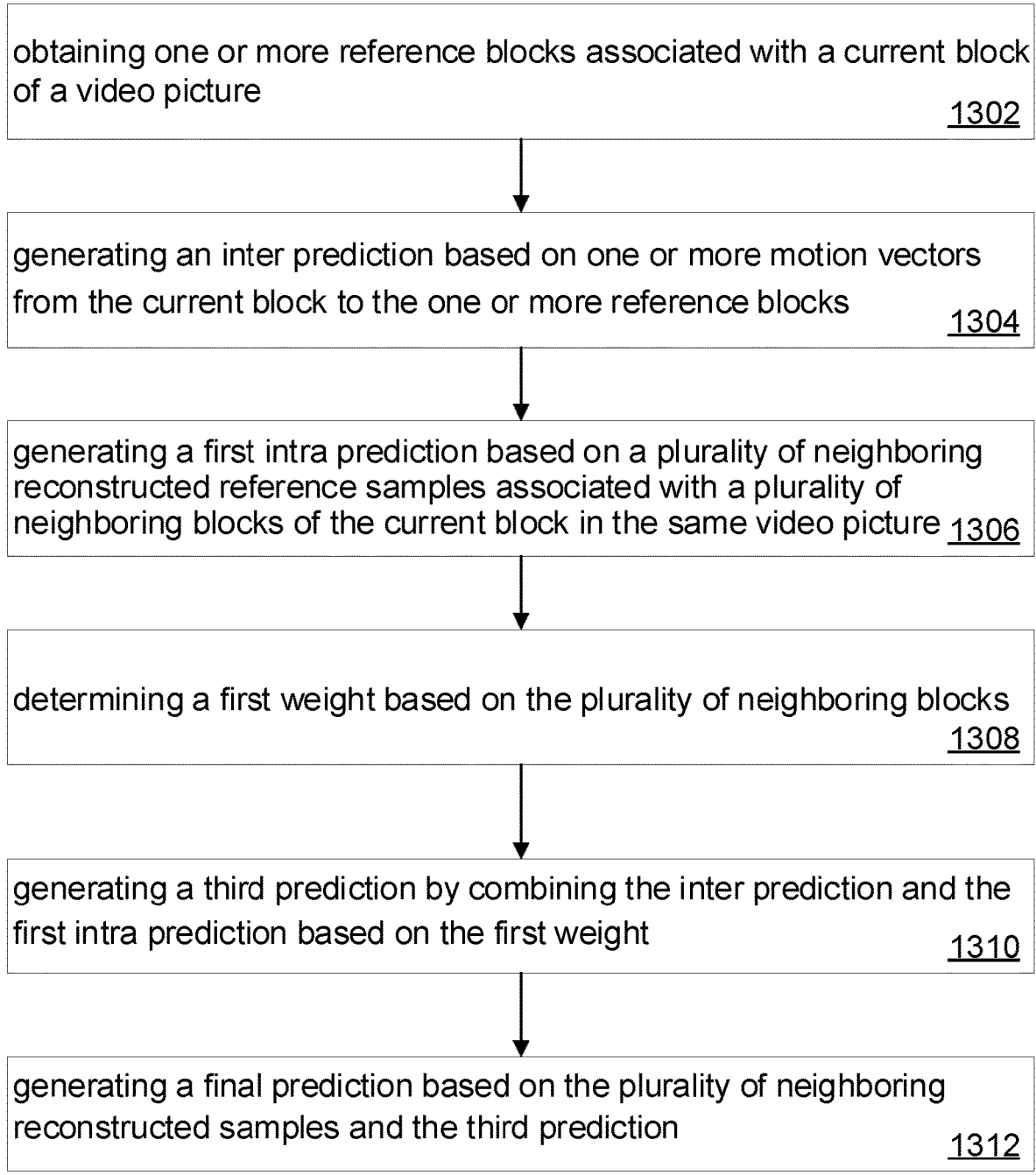
FIG. 13 is a flowchart illustrating an exemplary process of combining intra and inter prediction for video coding in accordance with some implementations of the present disclosure.

FIG. 13 is a flowchart illustrating an exemplary process of combining intra and inter prediction for video coding in accordance with some implementations of the present disclosure.

In step 1302, the processor 1220 obtains one or more reference blocks associated with a current block of a video picture, wherein the one or more reference blocks are associated with one or more previously coded pictures for predicting the current block.

In step 1304, the processor 1220 generates an inter prediction based on one or more motion vectors from the current block to the one or more reference blocks.

In step 1306, the processor 1220 generates a first intra prediction based on a plurality of neighboring reconstructed reference samples associated with a plurality of neighboring blocks of the current block in the same video picture.

In step 1308, the processor 1220 determines a first weight based on the plurality of neighboring blocks.

In step 1310, the processor 1220 generates a third prediction by combining the inter prediction and the first intra prediction based on the first weight.

In step 1312, the processor 1220 generates a final prediction based on the plurality of neighboring reconstructed samples and the third prediction.

The processor 1220 may generate the third prediction by generating the third prediction using following equation: $predCombl(x, y) = ((4 - W_{ciip}) \times P_{inter} + W_{ciip} \times P_{intra} + 2) >> 2$; wherein (x, y) indicates a position of a sample in the current block, predCombl(x, y) indicates the third prediction associated with the sample at the position, $W_{ciip}$ indicates the first weight, $P_{inter}$ indicates the inter prediction, $P_{intra}$ indicates the first intra prediction, and >> indicates a bitwise right shift operator.

The processor 1220 may generate the final prediction based on the plurality of neighboring reconstructed samples and the third prediction by generating the final prediction by applying position dependent intra prediction combination (PDPC) to the third prediction based on the on the left neighboring reconstructed reference sample and the top neighboring reconstructed reference sample of the sample at the position of the current block.

The processor 1220 may generate the final prediction using following equation: $FinalPred(x, y) = ((predCombl(x, y) << 6) + WL \times R_{-1,y} + WT \times R_{x,-1} + 32) >> 6$; wherein (x, y) indicates the position of the sample in the current block, FinalPred(x, y) indicates the final prediction associated with the sample at the position, predCombl(x, y) indicates the third prediction associated with the sample at the position, $R_{-1,y}$ indicates the left neighboring reconstructed reference sample, $R_{x,-1}$ indicates the top neighboring reconstructed reference sample, WL indicates a left neighboring weight, WT indicates a top neighboring weight, << indicates a bitwise left shift operator, and >> indicates the bitwise right shift operator.

The processor 1220 may generate the final prediction based on the plurality of neighboring reconstructed samples and the third prediction by generating a second intra prediction by applying the PDPC based on the left neighboring reconstructed reference sample and the top neighboring reconstructed reference sample of the sample at the position of the current block; and generating the final prediction by combining the third prediction and the second intra prediction.

The processor 1220 may generate the second intra prediction using following equation: $predPdpc(x, y) = (WL \times R_{-1,y} + WT \times R_{x,-1} + 32) >> 6$, wherein (x, y) indicates the position of the sample in the current block, predPdpc(x, y) indicates the second intra prediction associated with the sample at the position, $R_{-1,y}$ indicates the left neighboring reconstructed reference sample, $R_{x,-1}$ indicates the top neighboring reconstructed reference sample, WL indicates a left neighboring weight, WT indicates a top neighboring weight, and >> indicates the bitwise right shift operator.

The processor 1220 may generate the final prediction using following equation: $FinalPred(x, y) = ((predPdpc(x, y) << 6) + (64 - WL - WT) \times predCombl(x, y) + 32) >> 6$; wherein (x, y) indicates the position of the sample in the current block, predPdpc(x, y) indicates the second intra prediction associated with the sample at the position, predCombl(x, y) indicates the third prediction associated with the sample at the position, WL indicates the left neighboring weight, WT indicates the top neighboring weight, << indicates the bitwise left shift operator, and >> indicates the bitwise right shift operator.

The processor 1220 may further receives a flag indicating whether a weighted intra and inter prediction (WIIP) mode or a combined intra and inter prediction mode (CIIP) is enabled; in response to determining that the flag indicates that the WIIP mode is enabled, setting the first weight to be zero; and in response to determining that the flag indicates that the CIIP mode is enabled, setting the first weight to be non-zero.

The processor 1220 may generate the final prediction using following equation: $FinalPred(x, y) = ((predCombl(x, y) << 8) + W_{ciip} \times WL \times R_{-1,y} + W_{ciip} \times WT \times R_{x,-1} + 128) >> 8$; wherein (x, y) indicates the position of the sample in the current block, FinalPred(x, y) indicates the final prediction associated with the sample at the position, predCombl(x, y) indicates the third prediction associated with the sample at the position, $W_{ciip}$ indicates the first weight, WL indicates a left neighboring weight, WT indicates a top neighboring weight, $R_{-1,y}$ indicates the left neighboring reconstructed reference sample, $R_{x,-1}$ indicates the top neighboring reconstructed reference sample, << indicates a bitwise left shift operator, and >> indicates the bitwise right shift operator.

The processor 1220 may generates the first intra prediction based on the plurality of neighboring reconstructed reference samples associated with the plurality of neighboring blocks of the current block in the same video picture by generating the first intra prediction using following equation: $predPdpc(x, y) = (WL \times R_{-1,y} + WT \times R_{x,-1}) / W_{ciip}$; wherein (x, y) indicates a position of a sample in the current block, predPdpc(x, y) indicates the first intra prediction associated with the sample at the position, $W_{ciip}$ indicates the first weight, WL indicates a left neighboring weight, WT indicates a top neighboring weight, $R_{-1,y}$ indicates the left neighboring reconstructed reference sample of the sample at the position, $R_{x,-1}$ indicates the top neighboring reconstructed reference sample of the sample at the position.

Additionally, the processor 1220 may generates the inter prediction based on the motion vector from the current block to the reference block by generating the inter prediction using following equation: $predInter(x, y) = (64 - WL - WT) / (4 - W_{ciip}) \times P_{inter}(x, y)$; wherein (x, y) indicates the position of the sample in the current block, $P_{inter}(x, y)$ indicates the inter prediction associated with the sample at the position, $W_{ciip}$ indicates the first weight, WL indicates the left neighboring weight, WT indicates the top neighboring weight. And then the processor 1220 may generate the final prediction based on the plurality of neighboring reconstructed samples and the third prediction by generating the final prediction using following equation: $FinalPred(x, y) = ((4 - W_{ciip}) \times predInter(x, y) + W_{ciip} \times predPdpc(x, y) + 32) >> 6$; wherein (x, y) indicates the position of the sample in the current block, FinalPred(x, y) indicates the final prediction associated with the sample at the position, predInter(x, y) indicates the inter prediction associated with the sample at the position, predPdpc(x, y) indicates the first intra prediction associated with the sample at the position, $W_{ciip}$ indicates the first weight, and >> indicates a bitwise right shift operator.

In some examples, there is provided a computing device for video coding. The computing device includes one or more processors 1220; and a storage medium 1204 configured to store instructions executable by the one or more processors; where the processor, upon execution of the instructions, is configured to perform a method as illustrated in FIG. 13.

In some other examples, there is provided a non-transitory computer readable storage medium 1204, having instructions stored therein. When the instructions are executed by one or more processors 1220, the instructions cause the processor to perform a method as illustrated in FIG. 13.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

We claim:

1. A method of video coding, the method comprising:
obtaining one or more reference blocks associated with a current block of a video picture, wherein the one or more reference blocks are associated with one or more previously coded pictures for predicting the current block;
determining a first weight based on a plurality of neighboring blocks of the current block in a same video picture, wherein the first weight is a CIIP weight;
generating an inter prediction based on the first weight, a left neighboring weight, a top neighboring weight, and one or more motion vectors from the current block to the one or more reference blocks;
generating a position dependent intra prediction combination (PDPC)-based intra prediction based on a left neighboring reconstructed reference sample of a plurality of neighboring reconstructed reference samples, a top neighboring reconstructed reference sample of the plurality of neighboring reconstructed reference samples, the first weight, the left neighboring weight and the top neighboring weight, wherein the plurality of neighboring reconstructed reference samples are associated with the plurality of neighboring blocks of the current block in the same video picture; and
generating a final prediction based on the PDPC-based intra prediction, the inter prediction and the first weight.

2. The method of claim 1, further comprising:
generating a first intra prediction based on the plurality of neighboring reconstructed reference samples associated with the plurality of neighboring blocks of the current block in the same video picture;
generating a third prediction by combining the inter prediction and the first intra prediction based on the first weight.

3. The method of claim 1, further comprising:
receiving a flag indicating whether a weighted intra and inter prediction (WIIP) mode or a combined intra and inter prediction mode (CIIP) is enabled;
in response to determining that the flag indicates that the WIIP mode is enabled, setting the first weight to be zero; and
in response to determining that the flag indicates that the CIIP mode is enabled, setting the first weight to be non-zero.

4. The method of claim 1, wherein
generating the PDPC-based intra prediction based on the left neighboring reconstructed reference sample of the plurality of neighboring reconstructed reference samples, the top neighboring reconstructed reference sample of the plurality of neighboring reconstructed reference samples, the first weight, the left neighboring weight and the top neighboring weight comprises generating the PDPC-based intra prediction using following equation:

$$predPdpc(x, y) = (WL \times R_{-1,y} + WT \times R_{x,-1})/W_{ciip};$$

wherein (x, y) indicates a position of a sample in the current block, predPdpc(x, y) indicates the PDPC-based intra prediction associated with the sample at the position, $W_{ciip}$ indicates the first weight, WL indicates the left neighboring weight, WT indicates the top neighboring weight, $R_{-1,y}$ indicates the left neighboring reconstructed reference sample of the sample at the position, $R_{x,-1}$ indicates the top neighboring reconstructed reference sample of the sample at the position;
generating the inter prediction based on the first weight, the left neighboring weight, the top neighboring weight, and the motion vector from the current block to the reference block comprises generating the inter prediction using following equation:

$$predInter(x, y) = (64 - WL - WT)/(4 - W_{ciip}) \times P_{inter}(x, y);$$

wherein $P_{inter}(x, y)$ indicates the inter prediction associated with the sample at the position; and
generating the final prediction based on the PDPC-based intra prediction, the inter prediction and the first weight comprises generating the final prediction using following equation:

$$FinalPred(x, y) =$$
$$((4 - W_{ciip}) \times predInter(x, y) + W_{ciip} \times predPdpc(x, y) + 32) \gg 6;$$

wherein FinalPred(x, y) indicates the final prediction associated with the sample at the position, predInter(x, y) indicates the inter prediction associated with the sample at the position, and >> indicates a bitwise right shift operator.

5. A computing device, comprising:
a storage medium; and
one or more processors coupled to the storage medium, wherein the one or more processors are configured to perform acts comprising:
  obtaining one or more reference blocks associated with a current block of a video picture, wherein the one or more reference blocks are associated with one or more previously coded pictures for predicting the current block;
  determining a first weight based on a plurality of neighboring blocks of the current block in a same video picture, wherein the first weight is a CIIP weight;
  generating an inter prediction based on the first weight, a left neighboring weight, a top neighboring weight, and one or more motion vectors from the current block to the one or more reference blocks;
  generating a position dependent intra prediction combination (PDPC)-based intra prediction based on a left neighboring reconstructed reference sample of a plurality of neighboring reconstructed reference samples, a top neighboring reconstructed reference sample of the plurality of neighboring reconstructed reference samples, the first weight, the left neighboring weight and the top neighboring weight, wherein the plurality of neighboring reconstructed reference samples are associated with the plurality of neighboring blocks of the current block in the same video picture; and
  generating a final prediction based on the PDPC-based intra prediction, the inter prediction and the first weight.

6. The computing device of claim 5, wherein the one or more processors are further configured to perform acts comprising:
  generating a first intra prediction based on the plurality of neighboring reconstructed reference samples associated with the plurality of neighboring blocks of the current block in the same video picture;
  generating a third prediction by combining the inter prediction and the first intra prediction based on the first weight.

7. A non-transitory computer readable storage medium storing a plurality of programs for execution by a computing device having one or more processors, wherein the plurality of programs, when executed by the one or more processors, cause the one or more processors to perform acts comprising:
  obtaining one or more reference blocks associated with a current block of a video picture, wherein the one or more reference blocks are associated with one or more previously coded pictures for predicting the current block;
  determining a first weight based on a plurality of neighboring blocks of the current block in a same video picture, wherein the first weight is a CIIP weight;
  generating an inter prediction based on the first weight, a left neighboring weight, a top neighboring weight, and one or more motion vectors from the current block to the one or more reference blocks;
  generating a position dependent intra prediction combination (PDPC)-based intra prediction based on a left neighboring reconstructed reference sample of a plurality of neighboring reconstructed reference samples, a top neighboring reconstructed reference sample of the plurality of neighboring reconstructed reference samples, the first weight, the left neighboring weight and the top neighboring weight, wherein the plurality of neighboring reconstructed reference samples are associated with the plurality of neighboring blocks of the current block in the same video picture; and
  generating a final prediction based on the PDPC-based intra prediction, the inter prediction and the first weight.

8. The computing device of claim 5, wherein
generating the PDPC-based intra prediction based on the left neighboring reconstructed reference sample of the plurality of neighboring reconstructed reference samples, the top neighboring reconstructed reference sample of the plurality of neighboring reconstructed reference samples, the first weight, the left neighboring weight and the top neighboring weight comprises generating the PDPC-based intra prediction using following equation:

$$predPdpc(x, y) = (WL \times R_{-1,y} + WT \times R_{x,-1})/W_{ciip};$$

wherein (x, y) indicates a position of a sample in the current block, predPdpc(x, y) indicates the PDPC-based intra prediction associated with the sample at the position, $W_{ciip}$ indicates the first weight, WL indicates the left neighboring weight, WT indicates the top neighboring weight, $R_{-1,y}$ indicates the left neighboring reconstructed reference sample of the sample at the position, $R_{x,-1}$ indicates the top neighboring reconstructed reference sample of the sample at the position;
generating the inter prediction based on the first weight, the left neighboring weight, the top neighboring weight and the motion vector from the current block to the reference block comprises generating the inter prediction using following equation:

$$predInter(x, y) = (64 - WL - WT)/(4 - W_{ciip}) \times P_{inter}(x, y);$$

wherein $P_{inter}(x, y)$ indicates the inter prediction associated with the sample at the position; and
generating the final prediction based on the PDPC-based intra prediction, the inter prediction and the first weight comprises generating the final prediction using following equation:

$$FinalPred(x, y) =$$
$$((4 - W_{ciip}) \times predInter(x, y) + W_{ciip} \times predPdpc(x, y) + 32) \gg 6;$$

wherein FinalPred(x, y) indicates the final prediction associated with the sample at the position, predInter(x, y) indicates the inter prediction associated with the sample at the position, and >> indicates a bitwise right shift operator.

9. The non-transitory computer readable storage medium of claim 7, wherein the plurality of programs, when executed by the one or more processors, further cause the one or more processors to perform acts comprising:
  generating a first intra prediction based on the plurality of neighboring reconstructed reference samples associated with the plurality of neighboring blocks of the current block in the same video picture;

generating a third prediction by combining the inter prediction and the first intra prediction based on the first weight.

10. The non-transitory computer readable storage medium of claim 7, wherein generating the PDPC-based intra prediction based on the left neighboring reconstructed reference sample of the plurality of neighboring reconstructed reference samples, the top neighboring reconstructed reference sample of the plurality of neighboring reconstructed reference samples, the first weight, the left neighboring weight and the top neighboring weight comprises generating the PDPC-based intra prediction using following equation:

$$predPdpc(x, y) = (WL \times R_{-1,y} + WT \times R_{x,-1}) / W_{ciip};$$

wherein (x, y) indicates a position of a sample in the current block, predPdpc(x, y) indicates the PDPC-based intra prediction associated with the sample at the position, $W_{ciip}$ indicates the first weight, WL indicates the left neighboring weight, WT indicates the top neighboring weight, $R_{-1,y}$ indicates the left neighboring reconstructed reference sample of the sample at the position, $R_{x,-1}$ indicates the top neighboring reconstructed reference sample of the sample at the position;

generating the inter prediction based on the first weight, the left neighboring weight, the top neighboring weight and the motion vector from the current block to the reference block comprises generating the inter prediction using following equation:

$$predInter(x, y) = (64 - WL - WT) / (4 - W_{ciip}) \times P_{inter}(x, y);$$

wherein $P_{inter}(x, y)$ indicates the inter prediction associated with the sample at the position; and generating the final prediction based on the PDPC-based intra prediction, the inter prediction and the first weight comprises generating the final prediction using following equation:

$$FinalPred(x, y) =$$
$$((4 - W_{ciip}) \times predInter(x, y) + W_{ciip} \times predPdpc(x, y) + 32) \gg 6;$$

wherein FinalPred(x, y) indicates the final prediction associated with the sample at the position, predInter(x, y) indicates the inter prediction associated with the sample at the position, and >> indicates a bitwise right shift operator.

* * * * *